United States Patent
Hasegawa

(10) Patent No.: US 9,203,483 B2
(45) Date of Patent: Dec. 1, 2015

(54) RECEPTION APPARATUS, RADIO COMMUNICATION METHOD, AND RADIO COMMUNICATION SYSTEM

(75) Inventor: Tsuyoshi Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 474 days.

(21) Appl. No.: 13/559,758

(22) Filed: Jul. 27, 2012

(65) Prior Publication Data

US 2013/0052958 A1 Feb. 28, 2013

(30) Foreign Application Priority Data

Aug. 25, 2011 (JP) ................................. 2011-184190

(51) Int. Cl.
*H04B 1/00* (2006.01)
*H04B 7/04* (2006.01)
*H04B 1/10* (2006.01)
*H04B 7/08* (2006.01)

(52) U.S. Cl.
CPC ............ *H04B 7/0413* (2013.01); *H04B 1/1081* (2013.01); *H04B 7/0854* (2013.01)

(58) Field of Classification Search
CPC .... H04B 7/086; H04B 1/1081; H04B 7/0413; H04B 7/0854; H04W 16/14; H04W 7/0669
USPC .......... 455/61.3, 101; 375/148, 340, 346–349
See application file for complete search history.

(56) References Cited

U.S. PATENT DOCUMENTS

| | | | |
|---|---|---|---|
| 8,036,295 B2 | 10/2011 | Yoshida | |
| 2004/0017843 A1* | 1/2004 | Fitton et al. | 375/148 |
| 2006/0188043 A1* | 8/2006 | Zerbe et al. | 375/346 |
| 2006/0268963 A1 | 11/2006 | Yoshida | |
| 2007/0197166 A1* | 8/2007 | Kawamoto et al. | 455/65 |
| 2010/0020907 A1* | 1/2010 | Rezvani et al. | 375/347 |
| 2010/0142415 A1* | 6/2010 | Yu et al. | 370/279 |

FOREIGN PATENT DOCUMENTS

| | | |
|---|---|---|
| JP | 2006-339773 | 12/2006 |
| WO | 2005/086402 | 9/2005 |

OTHER PUBLICATIONS

Office Action dated Mar. 10, 2015, of Japanese Patent Application No. 2011-184190 with Partial Translation.

* cited by examiner

*Primary Examiner* — Nay A Maung
*Assistant Examiner* — Angelica M Perez
(74) *Attorney, Agent, or Firm* — Katten Muchin Rosenman LLP

(57) ABSTRACT

A reception apparatus includes a plurality of reception antennas configured to receive transmission signals transmitted from a plurality of transmission antennas, a first interference processing section configured to perform a weighting processing of imparting a weight to reduce a multipath interference component corresponding to an intersymbol interference based on a multipath while leaving an inter-antenna interference component corresponding to an interference component imparted by a transmission signal from one transmission antenna on the transmission signal from another transmission antenna among the plurality of transmission antennas with respect to each of a plurality of reception signals received by the plurality of reception antennas, and a second interference processing section configured to remove the inter-antenna interference component with respect to each of the plurality of reception signals on which the weighting processing is performed.

13 Claims, 11 Drawing Sheets

RECEPTION APPARATUS, RADIO COMMUNICATION METHOD, AND RADIO COMMUNICATION SYSTEM

CROSS-REFERENCE TO RELATED APPLICATION

This application is based upon and claims the benefit of priority of the prior Japanese Patent Application No. 2011-184190, filed on Aug. 25, 2011, the entire contents of which is incorporated herein by reference.

FIELD

Embodiments discussed herein are related to a reception apparatus that receives a radio signal, a radio communication method, and a radio communication system.

BACKGROUND

As a technology for realizing a high speed data transmission in a mobile radio communication, a multiple input multiple output (MIMO) multiplexing system is proposed, for example. The MIMO is a technology for transmitting multiple signals by using a same frequency and time from multiple transmission antennas and receiving the signals by multiple reception antennas to be separated into individual signals.

As an example of a signal separation system appropriate to a reception apparatus configured to receive, on the basis of the MIMO, radio signals where an influence of a multipath interference is small such as an orthogonal frequency division multiplexing (OFDM), a maximum likelihood detection (MLD) processing is proposed. The MLD processing is a signal separation processing of generating replicas of all transmission antenna signals and selecting a most likely transmission antenna signal by using the generated replicas to remove an inter-antenna interference.

In contrast to this, in a reception apparatus configured to receive radio signals where the influence of the multipath interference is large such as a code division multiple access (CDMA), a large number of adjacent signals are taken into account. For this reason, a complexity of the MLD processing is increased in an exponential manner, and it is difficult to realize the configuration.

In view of the above, in the radio system where the influence of the multipath interference is large, a minimum mean square error (MMSE) processing is executed to remove the influence of the multipath interference before the execution of the MLD processing. The MMSE processing is a processing of suppressing an interference from the transmission antenna other than the focused transmission antenna by way of a linear filter. In order that the reception apparatus corresponds to both the radio system with the small influence of the multipath interference and the radio system with the large influence of the multipath interference, the reception apparatus may implement both the MMSE processing and the MLD processing in some cases. For example, Japanese Laid-open Patent Publication No. JP2006-339773 discloses a technique in which the MMSE processing is executed before the MLD processing.

SUMMARY

According to an aspect of the invention, a reception apparatus includes a plurality of reception antennas configured to receive transmission signals transmitted from a plurality of transmission antennas, a first interference processing section configured to perform a weighting processing of imparting a weight to reduce a multipath interference component corresponding to an intersymbol interference based on a multipath while leaving an inter-antenna interference component corresponding to an interference component imparted by a transmission signal from one transmission antenna on the transmission signal from another transmission antenna among the plurality of transmission antennas with respect to each of a plurality of reception signals received by the plurality of reception antennas, and a second interference processing section configured to remove the inter-antenna interference component with respect to each of the plurality of reception signals on which the weighting processing is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments will be described. It is noted that combinations of configurations according to respective embodiments are also included in the embodiments.

While inventing the present embodiment, observations were made regarding a related art. Such observations include the following, for example.

In a MMSE processing of a related art, while leaving only the focused signals, a weighting is carried out to minimize interference components by the multipath interference and the inter-antenna interference. Therefore, in a case where the MLD processing resistant to the inter-antenna interference is executed after the MMSE processing, the interference removal processing against the inter-antenna interference is redundantly executed.

Figure 1:
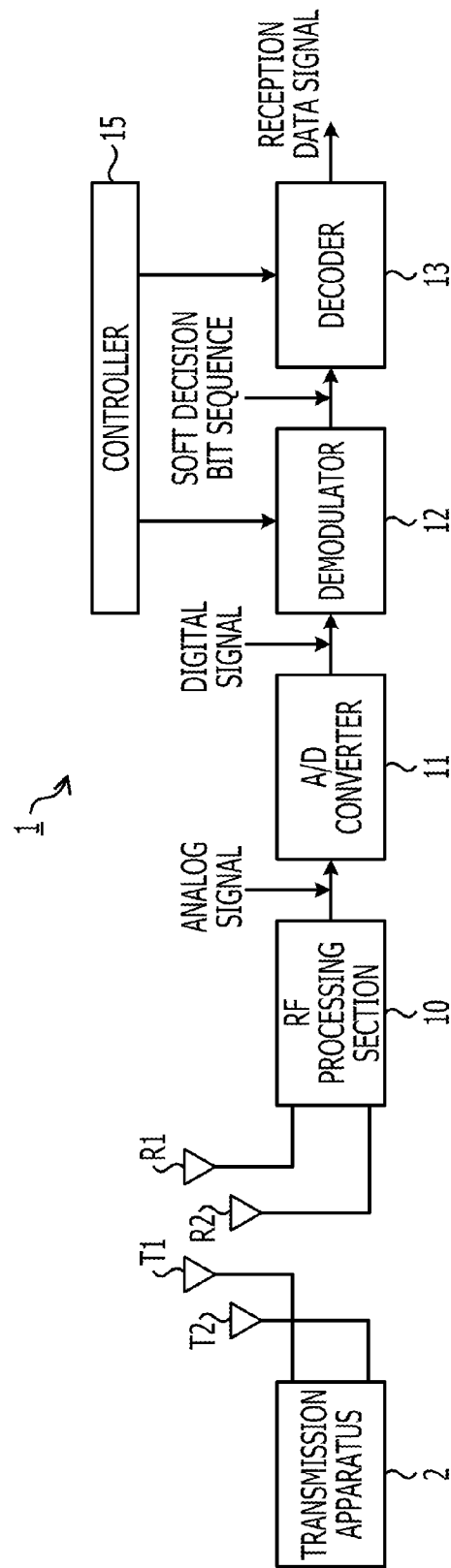
FIG. 1 is a block diagram of a reception apparatus.

FIG. 1 is a block diagram of a reception apparatus 1 according to the present embodiment. The reception apparatus 1 has a configuration for a MIMO system. The reception apparatus 1 has multiple reception antennas R1 and R2, an RF processing section 10, an A/D converter 11, a demodulator 12, a decoder 13, and a controller 15. The reception apparatus 1 receives signals wirelessly transmitted from a transmission apparatus 2 employing the MIMO by using multiple transmission antennas T1 and T2. By using the multiple signals in both the transmission apparatus 2 and the reception apparatus 1, it is possible to virtually form multiple parallel communication channels on a radio interface. With this configuration, a usage bandwidth can be increased without reducing an efficiency of the transmission power. It is noted that according to the present embodiment, for the sake of simplicity in the description, the MIMO from the two transmission antennas to the two reception antennas is described, but three or more transmission antennas and three or more reception antennas may be used.

The RF processing section 10 converts data signals received by the multiple reception antennas R1 and R2 from a radio frequency band into a base band. The A/D converter 11 converts analog data signals into digital signals. The demodulator 12 executes a demodulation processing such as a synchronous detection of the digitally converted data signals and the MIMO signal separation. The decoder 13 executes a decoding processing such as an error correction on the data signals corresponding to a soft decision bit sequence after the demodulation. The decoder 13 outputs the decoded data signals as reception data signals. The controller 15 controls the demodulation processing by the demodulator 12 and the decoding processing by the decoder 13.

As described above, the reception apparatus 1 employing the MIMO can receive the data signals transmitted from the transmission apparatus 2 employing the MIMO to execute the demodulation and decoding processing on the data signals.

Figure 2:
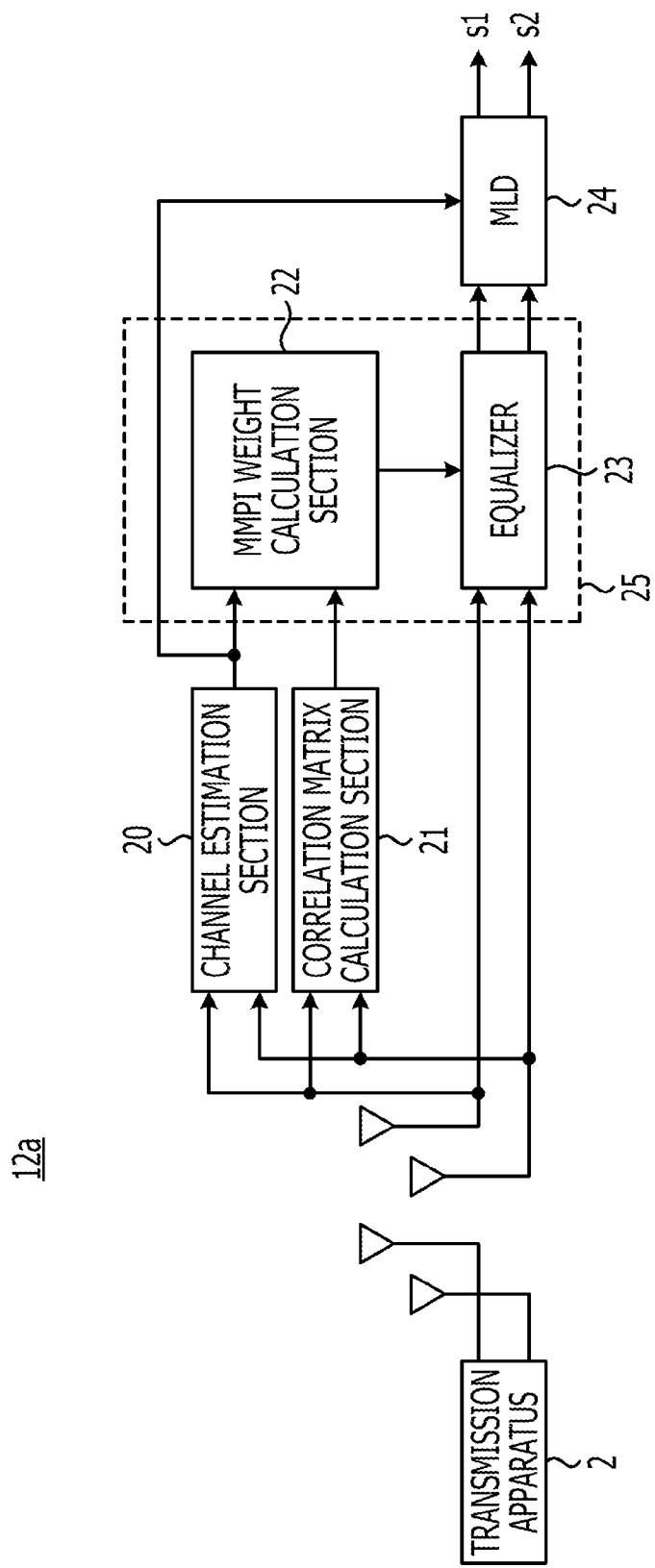
FIG. 2 is a detailed block diagram of a demodulator.

FIG. 2 is a detailed block diagram of a demodulator 12a corresponding to an embodiment of the demodulator 12. The demodulator 12a has a channel estimation section 20, a correlation matrix calculation section 21, an interference processing section 25, and an MLD 24.

With respect to each of the multiple reception signals received by the multiple reception antennas, while leaving the interference from the unfocused transmission antenna (interference imparted by the transmission signal from a certain transmission antenna on the transmission signal from another transmission antenna), that is, the inter-antenna interference, the interference processing section 25 reduces the intersymbol interference by the multipath, that is, the multipath interference. The interference processing section 25 has a minimum mean partial interference (MMPI) weight calculation section 22 and an equalizer 23.

The channel estimation section 20 performs an estimation processing for a propagation channel vector by using a pilot signal or the like in the reception signal. The channel estimation section 20 outputs the estimated propagation channel vector. The correlation matrix calculation section 21 calculates a correlation matrix of the reception signal. The channel estimation section 20 outputs the calculated correlation matrix.

The MMPI weight calculation section 22 calculates an MMPI weight factor on the basis of the propagation channel vector output from the channel estimation section 20 and the correlation matrix output from the correlation matrix calculation section 21. The MMPI weight calculation section 22 linearly combines the weight factor with respect to the inter-antenna interference with an MMSE weight factor. With this configuration, the MMPI weight calculation section 22 can calculate the weight factor at which only the power of the multipath interference is minimized while leaving the inter-antenna interference. A detail of the MMPI processing based on the weight factor will be described below. The equalizer 23 performs the weighting on the reception signal with the MMPI weight factor calculated by the MMPI weight calculation section 22. The MLD 24 executes the MLD processing on the reception signal after the weighting processing.

The detail of the processing in the MMPI weight calculation section 22 and the MLD 24 will be described below. A calculation condition for the MMPI weight factor is as follows. It is assumed that the transmission apparatus 2 transmits a relatively small number of signals in a burst manner. When the number of the transmission antennas is two and the number of the reception antennas is also two, a reception signal v is represented by Expression (1).

$$v = Hs + n \tag{1}$$

$$H = \begin{pmatrix} H_{11} & H_{12} \\ H_{21} & H_{22} \end{pmatrix} \tag{2}$$

$$s = \begin{pmatrix} s_1 \\ s_2 \end{pmatrix} \tag{3}$$

$$v = \begin{pmatrix} v_1 \\ v_2 \end{pmatrix} \tag{4}$$

In Expression (1), H represents a characteristic of a propagation path from the transmission antennas T1 and T2 to the reception antennas R1 and R2, s represents a transmission signal vector from the transmission antennas T1 and T2, and n represents Gaussian noise. According to the present embodiment, it is assumed that the number of the transmission antennas and the number of the reception antennas are two, respectively. Transmission symbols $s_1$ and $s_2$ from the transmission antennas T1 and T2 each represent a vertical vector having a length Nt. For example, the transmission symbol $s_1$ corresponds to $(s_{1,1}, s_{1,2}, \ldots s_{1,Nt})^T$ or the like. This vertical vector represents that Nt symbols are continuously transmitted from each of the antennas at the same time. Since s is a vector obtained by vertically arranging $s_1$ and $s_2$, s corresponds to the vertical vector having a length of 2×Nt. The propagation path H is a quasi-static multipath fading that does not change while the Nt symbol is transmitted. When a length of a path profile is set as Np [chip], $H_{11}$ and the like correspond to a matrix of (Nt+ Np−1)×Nt. Therefore, the propagation path H correspond to a matrix with doubled vertical and horizontal sizes of this matrix. $v_1$ and $v_2$ represent reception signal vectors of the reception antennas R1 and R2. A length of each of the reception signal vectors is (Nt+Np−1).

As illustrated in FIG. 2, in a case where the MLD that can efficiently remove the inter-antenna interference is arranged in a stage after the demodulator, in the equalizer 23, the multipath interference can be suppressed by priority while leaving the inter-antenna interference. When a signal power of the focused transmission signal is represented by $s_{1,i}$ and an interference power by the inter-antenna interference is represented by $s_{2,i}$, a mean error power Ei in the equalizer 23 is represented by Expression (5).

$$E_i = \langle |w_i^H v - \alpha s_{1,i} - \beta s_{2,i}|^2 \rangle \tag{5}$$

$$E_i = w_i^H R w_i - \alpha P_t h_{1,i}^H w_i - \alpha^* P_t w_i^H h_{1,i} - \beta P_t h_{2,i}^H w_i - \beta^* P_t w_i^H h_{2,i} + \alpha^2 P_t + \beta^2 P_t \tag{6}$$

In Expression (5), <X> represents an expected value of X, w represents a composite weight vector, and $X^H$ represents Hermit transposed matrix of X. In addition, factors α and β represent factors for allowing a degree of freedom in the weighting on the signal power $s_{1,i}$ and the interference power $s_{2,i}$.

Expression (6) is obtained by developing Expression (5). In Expression (6), X* is a complex conjugate of X, h is a propagation channel vector, R is a correlation matrix of the reception signal, and Pt is a mean power of the transmission signal. The propagation channel vector h is an output signal of the channel estimation section 20. The correlation matrix R is an output signal of the correlation matrix calculation section 21. The mean error power Ei is minimized with respect to the composite weight vector w and the correction factor β in a case where the following condition in Expression (7) is satisfied.

$$\frac{\partial E_i}{\partial w_i^H} = 0, \; \frac{\partial E_i}{\partial \beta} = 0 \qquad (7)$$

From Expression (7), the composite weight vector w and the correction factor β are represented by Expression (8) and Expression (9). By assigning Expression (8) for Expression (9), the correction factor β is represented by Expression (10).

$$Rw_i - \alpha^* P_t h_{1,i} - \beta^* P_t h_{2,i} = 0, \qquad (8)$$

$$w_i = \alpha^* P_t R^{-1} h_{1,i} + \beta^* P_t R^{-1} h_{2,i}$$

$$\beta^* P_t - P_t h_{2,i}^H w_i = 0, \qquad (9)$$

$$\beta^* = h_{2,i}^H w_i$$

$$\beta^* = \frac{\alpha^* P_t h_{2,i}^H R^{-1} h_{1,i}}{1 - P_t h_{2,i}^H R^{-1} h_{2,i}} \qquad (10)$$

Expression (8) and Expression (10) are each a parameter of the i-th signal. In a case where the transmission apparatus 2 continuously transmits a sufficiently lengthy signal, in the symbol in the vicinity of the center, w takes a same value irrespective of i. Therefore, when a composite weight vector for the transmission antenna T1 is represented by w1, Pt=1, and α=1, the composite weight vector w1 and the correction factor β1 are represented by Expression (11) and Expression (12), respectively. In addition, when a composite weight vector for the transmission antenna T2 is represented by w2, the composite weight vector w2 and the correction factor β2 are represented by Expression (13) and Expression (14), respectively.

$$w_1 = R^{-1} h_1 + \beta_1^* R^{-1} h_2 \qquad (11)$$

$$\beta_1 = \frac{h_1^H R^{-1} h_2}{1 - h_2^H R^{-1} h_2} \qquad (12)$$

$$w_2 = R^{-1} h_2 + \beta_2^* R^{-1} h_1 \qquad (13)$$

$$\beta_2 = \frac{h_2^H R^{-1} h_1}{1 - h_1^H R^{-1} h_1} \qquad (14)$$

The MLD 24 functions as an interference processing section configured to remove the inter-antenna interference component with respect to each of the multiple reception signals after the execution of the interference component removal by the interference processing section 25. A detail of the processing in the MLD 24 after the execution of the weighting by the equalizer 23 will be described below. When the composite weight vectors w1 and w2 are the conventional MMSE weight, a propagation path matrix $H'_{2 \times 2}$ of the propagation path also including the equalizer is represented by Expression (15).

$$H'_{2 \times 2} = \begin{pmatrix} 1 & \beta_1 \\ \beta_2 & 1 \end{pmatrix} \begin{pmatrix} w_1^H h_1 & w_1^H h_2 \\ w_2^H h_1 & w_2^H h_2 \end{pmatrix} \qquad (15)$$

$$e(s) = \|H'_{2 \times 2} s - v'_m\|^2 \qquad (16)$$

A square Euclidean distance e(s) can be represented by Expression (16) by using the propagation path matrix $H'_{2 \times 2}$ in Expression (15) and the reception signal $v'_m$ after the execution of the weighting processing by the equalizer 23. The transmission signal vector s in Expression (16) is a vector including the transmission symbols of the two antennas as described in Expression (3) above. In Expression (16), by obtaining s1,i and s2,i at which e(s) is minimized, the MLD 24 can estimate the transmission symbol.

After the multipath interference noise is removed in a state in which the inter-antenna interference noise is left, by removing the inter-antenna interference noise as described above, the demodulator 12a can execute the equalizing processing while the inter-antenna interference noise removal through the MLD processing is taken into account.

Figure 3:
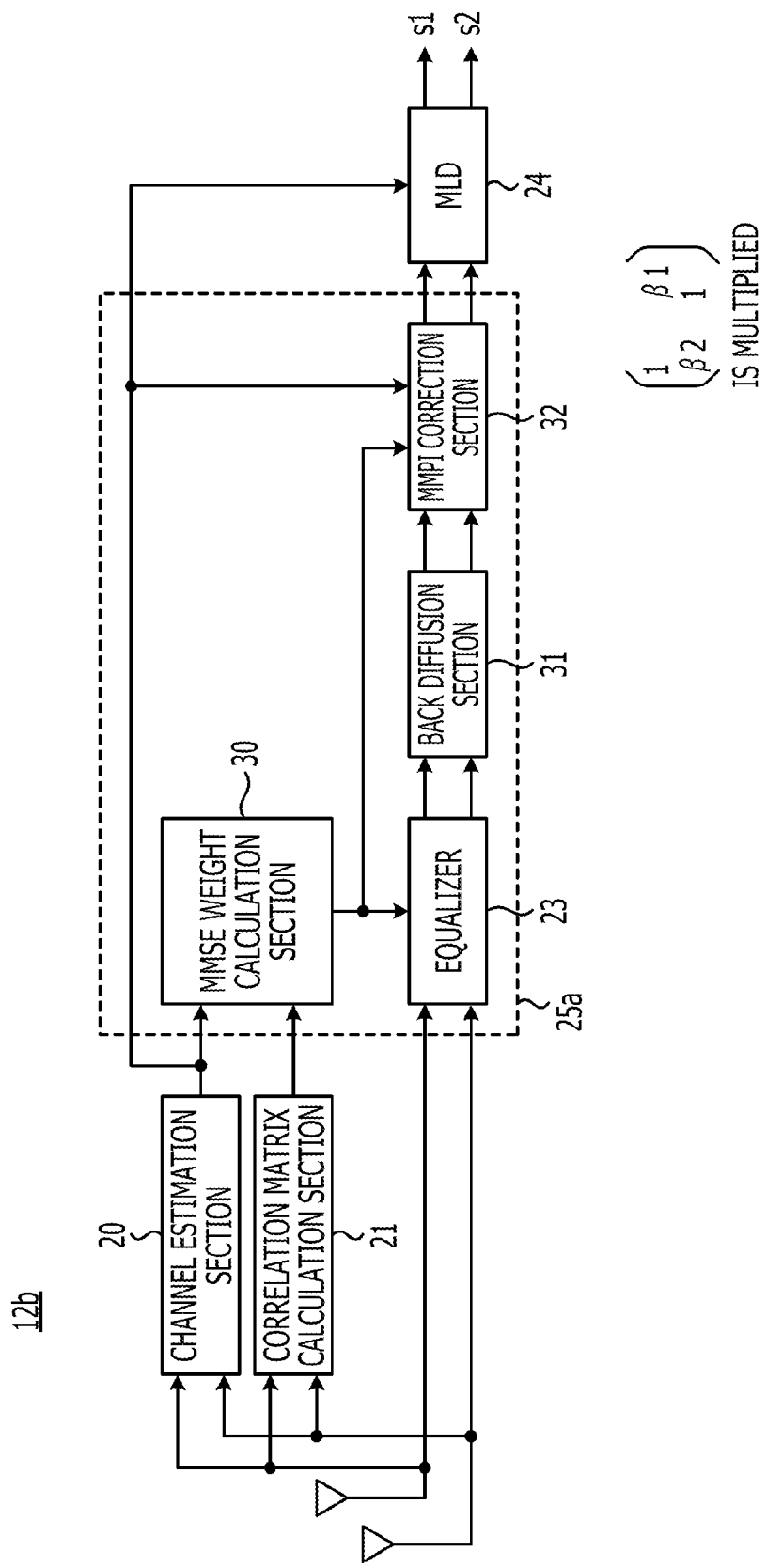
FIG. 3 is a detailed block diagram of another demodulator.

FIG. 3 is a detailed block diagram of a demodulator 12b corresponding to an embodiment of the demodulator 12. The demodulator 12b has the channel estimation section 20, the correlation matrix calculation section 21, an interference processing section 25a, and the MLD 24. The interference processing section 25a executes the MMPI processing. The interference processing section 25a has an MMSE weight calculation section 30, the equalizer 23, a despreading section 31, and a MMPI correction section 32. In the demodulator 12b of FIG. 3, the same component as the demodulator 12a of FIG. 2 is assigned with the same reference sign, and a description thereof will be omitted.

Whereas the demodulator 12a executes the MMPI processing by the MMPI weight calculation section 22, the demodulator 12b makes an adjustment so that the MMPI processing is executed in the MMPI correction section 32 after the normal MMSE processing is executed by the MMSE weight calculation section 30. The above-mentioned configuration can be realized because the MMPI processing is a linear combination of the MMSE weight factor. The separation is carried out into the MMSE weight calculation section 30 and the MMPI correction section 32 on the basis of the linearity of the MMPI processing, so that a degree of freedom in design can be improved.

The MMSE weight calculation section 30 functions as a weight calculation section configured to calculate a weighting factor of the first term in Expression (11) and Expression (13). The despreading section 31 executes a despreading processing on the spread and modulated reception signal on which the weighting processing of the first term in Expression (11) and Expression (13) to return to the signal before the spreading and modulation. In a case where the calculation amount is taken into account, the despreading processing is preferably executed after the execution of the weighting processing by the equalizer 23.

The MMPI correction section 32 executes the weighting processing of the second term in Expression (11) and Expression (13) on the reception signal after the despreading processing. To be more specific, the reception signal after the despreading processing in the despreading section 31 is multiplied by a matrix represented in Expression (17). With the multiplication of Expression (17), the reception signal output from the MMPI correction section 32 is a signal on which the inter-antenna interference component, which is once is subtracted, is added.

$$\begin{pmatrix} 1 & \beta_1 \\ \beta_2 & 1 \end{pmatrix} \quad (17)$$

As described above, by inserting the MMPI correction section 32 between the MMSE weight calculation section 30 and the MLD 24, the demodulator 12b can execute the equalizing processing while the inter-antenna interference noise removal through the MLD processing is taken into account.

Figure 4:
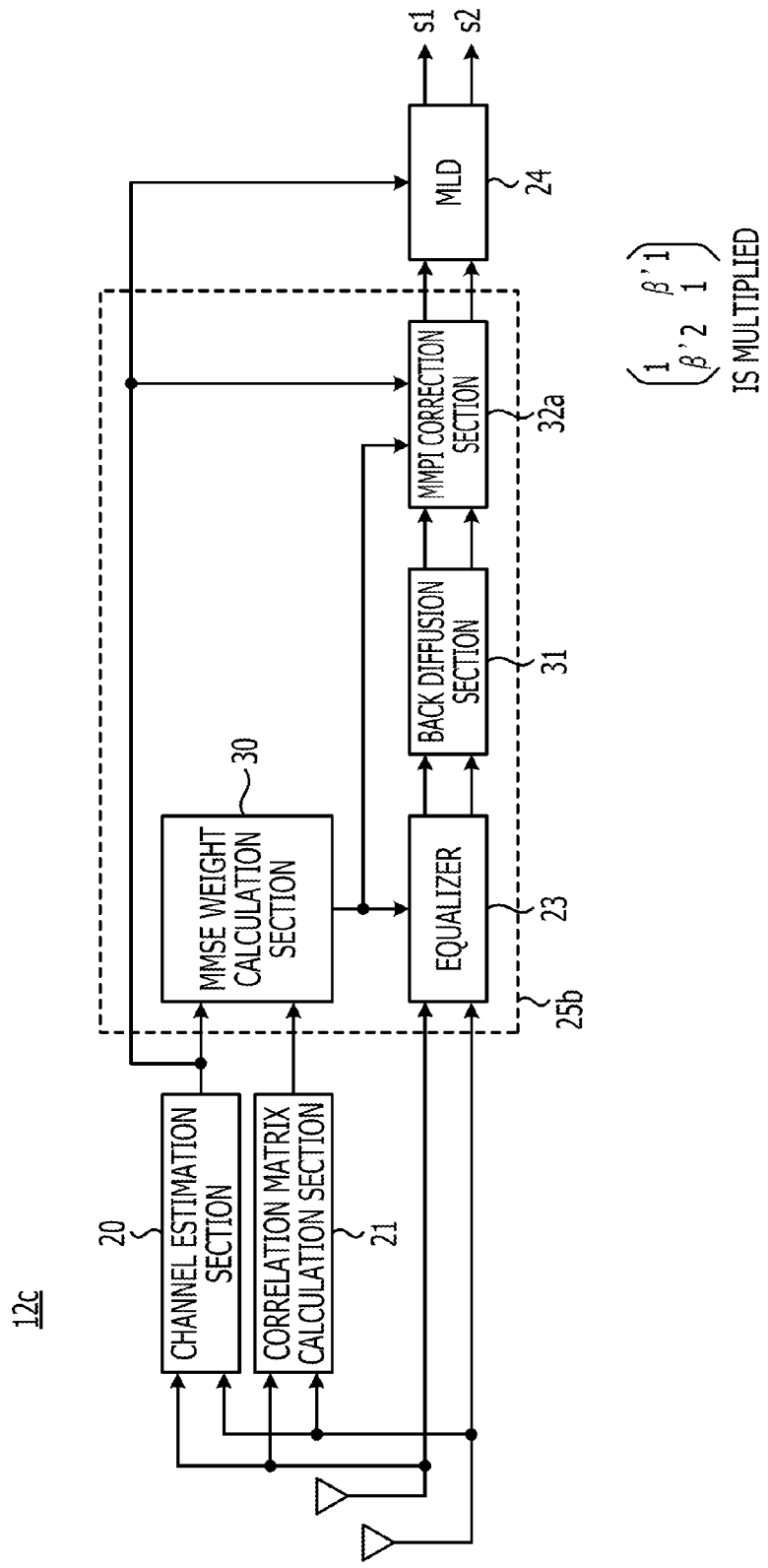
FIG. 4 is a detailed block diagram of another demodulator.

FIG. 4 is a detailed block diagram of a demodulator 12c corresponding to an embodiment of the demodulator 12. The demodulator 12c has the channel estimation section 20, the correlation matrix calculation section 21, an interference processing section 25b, and the MLD 24. The interference processing section 25b executes the MMPI processing. The interference processing section 25b has the MMSE weight calculation section 30, the equalizer 23, the despreading section 31, and an MMPI correction section 32a. In the demodulator 12c of FIG. 4, the same component as the demodulator 12b of FIG. 3 is assigned with the same reference sign, and a description thereof will be omitted.

In contrast to the demodulator 12b, in the MMPI correction section 32a, the demodulator 12c multiplies the correction factor different from the MMPI correction section 32. The MMPI correction section 32a in the demodulator 12c multiplies the output of the despreading section 31 by a matrix represented in Expression (18). In Expression (18), a correction factor β' has a value represented in Expression (19) and Expression (20). The correction factor β' is a value obtained by adding a variable A to a denominator of Expression (12) and Expression (14) for obtaining the correction factor β.

$$\begin{pmatrix} 1 & \beta'_1 \\ \beta'_2 & 1 \end{pmatrix} \quad (18)$$

$$\beta'_1 = \frac{h_2^H R^{-1} h_1}{1 + A - h_2^H R^{-1} h_2} \quad (19)$$

$$\beta'_2 = \frac{h_1^H R^{-1} h_2}{1 + A - h_1^H R^{-1} h_1} \quad (20)$$

With the correction factor β, after leaving the inter-antenna interference noise, even when the inter-antenna interference noise is removed through the MLD processing, the inter-antenna interference noise remains in actuality. In view of the above, by adding the variable A like the correction factor β', in accordance with the processing result of the MLD 24, it is possible to adjust the value of the variable A so that the value of the correction factor β' is decreased.

It is noted that according to the present embodiment, the variable A is added to decrease the correction factor β, but the correction factor β may be decreased by multiplying the correction factor β by a variable lower than 1.

As described above, by setting the correction factor β of an MMPI correction section 32b to be adjustable between the MMSE weight calculation section 30 and the MLD 24, the demodulator 12c can execute the equalizing processing in which the inter-antenna interference noise removal through the MLD processing is further taken into account.

Figure 5:
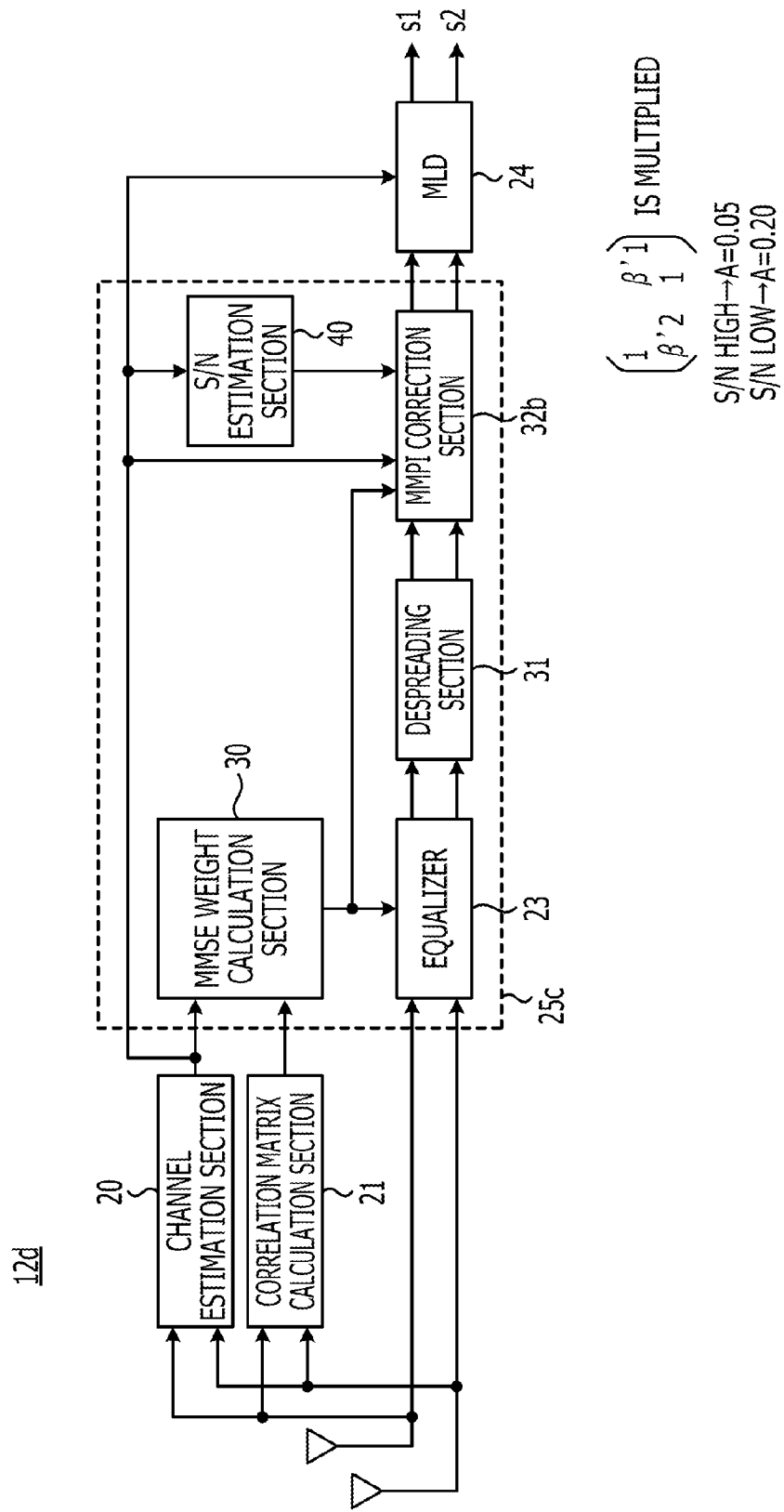
FIG. 5 is a detailed block diagram of another demodulator.

FIG. 5 is a detailed block diagram of a demodulator 12d corresponding to an embodiment of the demodulator 12. The demodulator 12d has the channel estimation section 20, the correlation matrix calculation section 21, an interference processing section 25c, and the MLD 24. The interference processing section 25c executes the MMPI processing. The interference processing section 25c has the MMSE weight calculation section 30, the equalizer 23, the despreading section 31, the MMPI correction section 32b, and an S/N estimation section 40. In the demodulator 12d of FIG. 5, the same component as the demodulator 12c of FIG. 4 is assigned with the same reference sign, and a description thereof will be omitted.

In contrast to the demodulator 12c, the demodulator 12d is newly provided with the S/N estimation section 40. In addition, the demodulator 12d has the MMPI correction section 32b configured to adjust the variable A of the correction factor β' in accordance with the output signal of the S/N estimation section 40.

The S/N estimation section 40 outputs an estimation value of a signal-to-noise ratio of the reception signal (S/N ratio) on the basis of the output of the channel estimation section 20. As the signal-to-noise ratio is higher, the more the MLD processing effectively functions, and therefore it suffices that a correction amount by the correction factor β' is higher. On the other hand, when the signal-to-noise ratio, the effectiveness of the MLD processing is decreased, and therefore, it suffices that the correction amount by the correction factor β' is set to be lower.

The MMPI correction section 32b decides the value of the variable A of the correction factor β' on the basis of the estimation value of the signal-to-noise ratio output from the S/N estimation section 40. For example, the MMPI correction section 32b compares the estimation value of the signal-to-noise ratio with a previously set threshold. The MMPI correction section 32b decides the value of the variable A on the basis of the comparison result. For example, in a case where the estimation value is higher than the threshold, the MMPI correction section 32b sets A=0.05. In a case where the estimation value is lower than or equal to the estimation value, the MMPI correction section 32b sets A=0.2.

As described above, by setting the correction factor β' of the MMPI correction section 32b to be adjustable in accordance with the signal-to-noise ratio of the reception signal, the demodulator 12d can execute the equalizing processing in which the inter-antenna interference noise removal through the MLD processing is further taken into account.

It is noted that the decision on the variable A may also be carried out on the basis of not only the signal-to-noise ratio but also a multicode number. A detail of the decision method for the variable A based on the multicode number will be described below.

Figure 6:
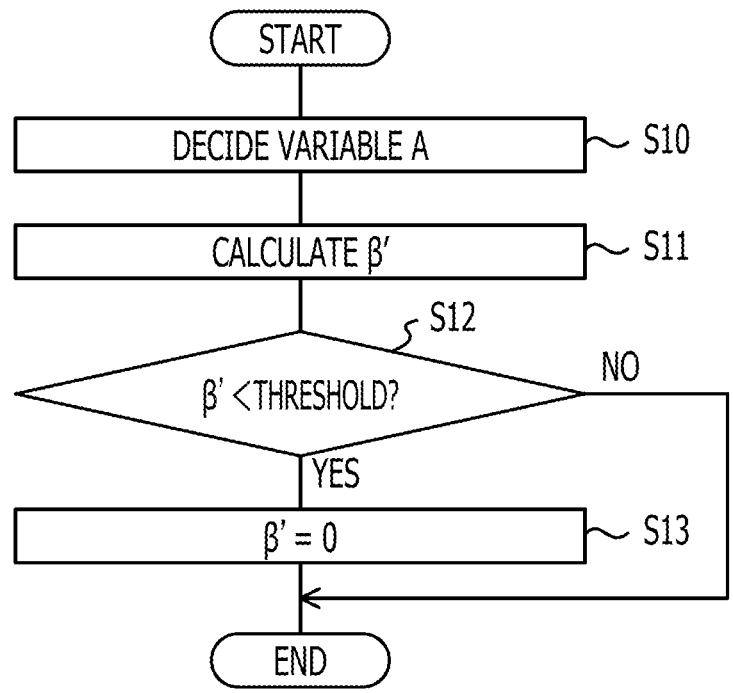
FIG. 6 illustrates a flowchart for a correction factor in an MMPI correction section.

FIG. 6 is a flowchart for the correction factor β' in the MMPI correction section 32b. As the value of the variable A corresponding to the denominator of the correction factor β' is set to be higher, the correction factor β' is smaller. A computation load becomes wasteful when the correction factor β' is calculated and a correction computation is further executed in a case where the correction factor β' is almost zero. Therefore, in a case where the correction factor β' is almost zero, by simplifying the correction computation, it is possible to avoid an increase in the wasteful computation load.

The MMPI correction section 32b decides the value of the variable A on the basis of the estimation value of the signal-to-noise ratio or the like (step S10). The MMPI correction section 32b calculates the correction factor β' by using the decided value of the variable A (step S11). The MMPI correction section 32b performs a magnitude comparison between the calculated correction factor β' and the previously set threshold (step S12). In a case where the calculated correction factor β' is lower than the threshold (step S12: YES), the MMPI correction section 32b executes the MMPI processing on the reception signal while β'=0 is set (step S13). In a case where the calculated correction factor β' is higher than or equal to the threshold (step S12: No), the MMPI correction section 32b executes the MMPI processing on the reception signal by using the calculated correction factor β'.

By simplifying the correction computation in accordance with the value of the correction factor β' as described above, the MMPI correction section 32b can avoid the increase in the wasteful computation load.

Figure 7:
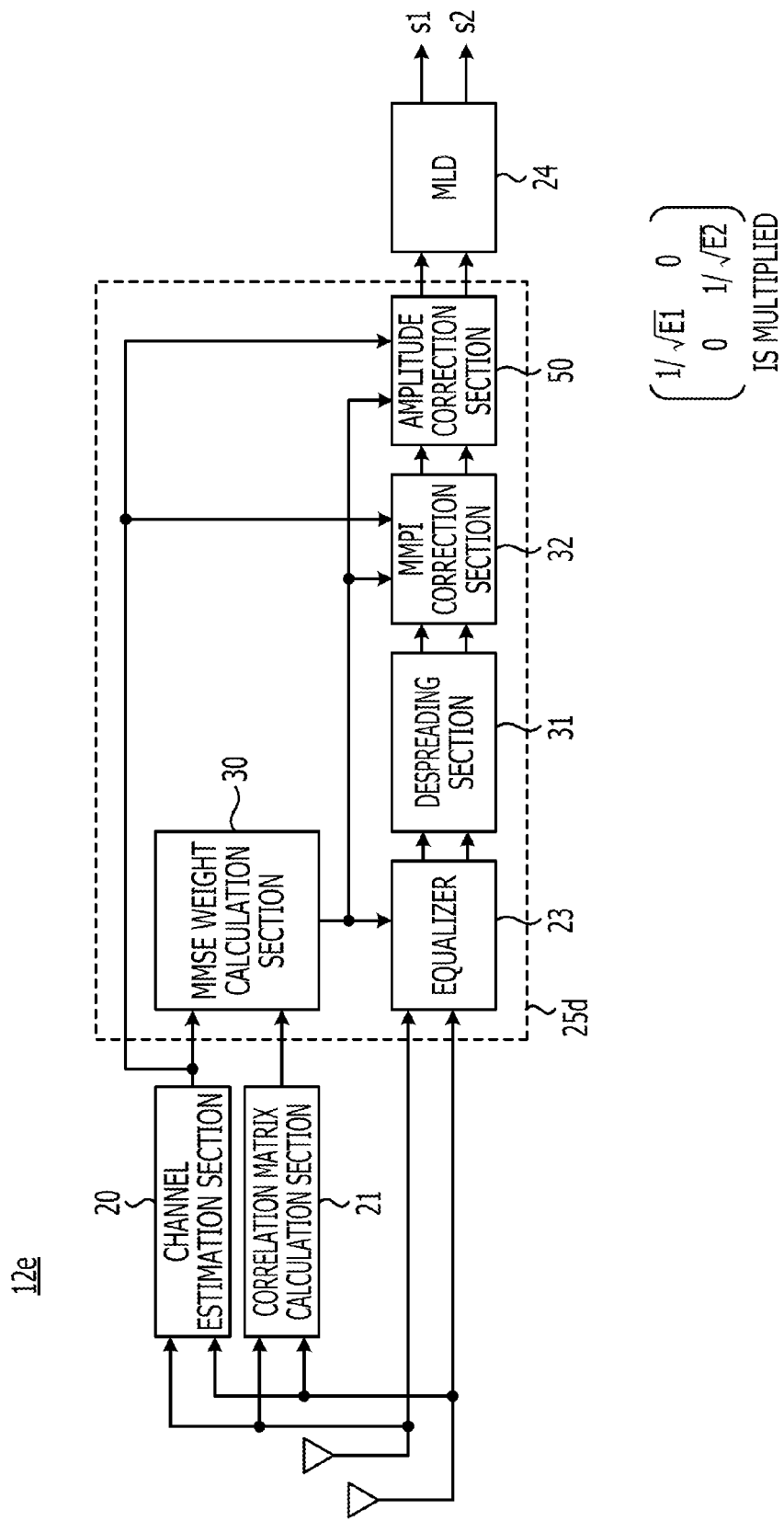
FIG. 7 is a detailed block diagram of another demodulator.

FIG. 7 is a detailed block diagram of a demodulator 12e corresponding to an embodiment of the demodulator 12. The demodulator 12e has the channel estimation section 20, the correlation matrix calculation section 21, an interference processing section 25d, and the MLD 24. The interference processing section 25d executes the MMPI processing. The interference processing section 25d has the MMSE weight calculation section 30, the equalizer 23, the despreading section 31, the MMPI correction section 32, and an amplitude correction section 50. In the demodulator 12e of FIG. 7, the same component as the demodulator 12b of FIG. 3 is assigned with the same reference sign, and a description thereof will be omitted.

In contrast to the demodulator 12b, the demodulator 12e is newly provided with the amplitude correction section 50. As described above, the MLD 24 executes a hard decision processing on the basis of a minimum distance search result by calculating the square Euclidean distance between the receive symbol replica and the reception signal. At this time, in order that the hard decision processing result corresponds to the maximum likelihood, it is supposed that the mean noise powers of the respective reception signals are stable.

However, if the MMPI processing is executed before the execution of the MLD processing, the mean noise power changes. For this reason, since the precondition for the MLD processing that the mean noise powers of the respective reception signals are stable is no longer satisfied, this situation becomes a cause for a decrease in the accuracy of the MLD processing.

In view of the above, before the MLD processing is executed, by normalizing the reception signal after the MMPI processing and setting the mean noise power of the reception signal after the MMPI processing to be stable, it is possible to improve the accuracy of the MLD processing.

When Expression (13) representing the composite weight is assigned for Expression (6) for obtaining a residual error, the mean error power Ei in the MMPI processing is represented by Expression (21). By assigning the correction factor β in Expression (10) for Expression (21), Expression (22) is established. In Expression (22), since a component in Re{ } is a real number, Expression (22) corresponds to Expression (23).

$$E_i = |\alpha|^2 P_t(1 - P_t h_{1,i}^H R^{-1} h_{1,i}) + \qquad (21)$$
$$|\beta|^2 P_t(1 - P_t h_{2,i}^H R^{-1} h_{2,i}) - 2\text{Re}\{\alpha\beta^* P_t^2 h_{1,i}^H R^{-1} h_{2,i}\}$$

$$E_i = |\alpha|^2 P_t(1 - P_t h_{1,i}^H R^{-1} h_{1,i}) + \qquad (22)$$
$$\frac{|\alpha|^2 P_t^3 |h_{2,i}^H R^{-1} h_{1,i}|^2}{(1 - P_t h_{2,i}^H R^{-1} h_{2,i})} - 2\text{Re}\left\{\frac{|\alpha|^2 P_t^3 |h_{2,i}^H R^{-1} h_{1,i}|^2}{(1 - P_t h_{2,i}^H R^{-1} h_{2,i})}\right\}$$

$$E_i = |\alpha|^2 P_t(1 - P_t h_{1,i}^H R^{-1} h_{1,i}) - \frac{|\alpha|^2 P_t^3 |h_{2,i}^H R^{-1} h_{1,i}|^2}{(1 - P_t h_{2,i}^H R^{-1} h_{2,i})} \qquad (23)$$

In Expression (23), similarly as in the derivation of the correction factor β in the MMPI processing, when i is deleted and Pt=α=1 is established, a residual error power E1 included in the transmission signal of the transmission antenna T1 is represented by Expression (24). Similarly, a residual error power E2 included in the transmission signal of the transmission antenna T2 is represented by Expression (25).

$$E_1 = (1 - h_1^H R^{-1} h_1) - \frac{|h_2^H R^{-1} h_1|^2}{(1 - h_2^H R^{-1} h_2)} \qquad (24)$$

$$E_2 = (1 - h_2^H R^{-1} h_2) - \frac{|h_2^H R^{-1} h_1|^2}{(1 - h_1^H R^{-1} h_1)} \qquad (25)$$

A propagation path matrix $H''_{2\times 2}$ also including the residual error normalization is represented by Expression (26). By dividing the propagation path matrix $H'_{2\times 2}$ output from the MMPI correction section 32 by a root $\sqrt{Ei}$ of the residual error calculated in Expression (24) and Expression (25), the amplitude correction section 50 can calculate the propagation path matrix $H''_{2\times 2}$ represented in Expression (26).

The square Euclidean distance e(s) between the propagation path matrix $H''_{2\times 2}$ obtained from Expression (26) and the reception signal $v''_m$ that is normalized by the residual error after the execution of the MMPI processing is represented in Expression (27). By obtaining s1 and s2 at which e(s) in Expression (27) is minimized, it is possible to estimate the transmission signal. The MLD 24 calculates s1 and s2 at which e(s) is minimized on the basis of Expression (27).

$$H''_{2\times 2} = \begin{pmatrix} 1/\sqrt{E_1} & 0 \\ 0 & 1/\sqrt{E_2} \end{pmatrix} \begin{pmatrix} 1 & \beta_1 \\ \beta_2 & 1 \end{pmatrix} \begin{pmatrix} w_1^H h_1 & w_1^H h_2 \\ w_2^H h_1 & w_2^H h_2 \end{pmatrix} \qquad (26)$$

$$e(s) = \|H''_{2\times 2} s - v''_m\|^2 \qquad (27)$$

As described above, by inserting the amplitude correction section 50 in a stage before the MLD 24, the demodulator 12e can normalize the propagation path matrix before the MLD processing. By normalizing the propagation path matrix before the MLD processing, the demodulator 12e can improve the accuracy of the MLD processing.

Figure 8:
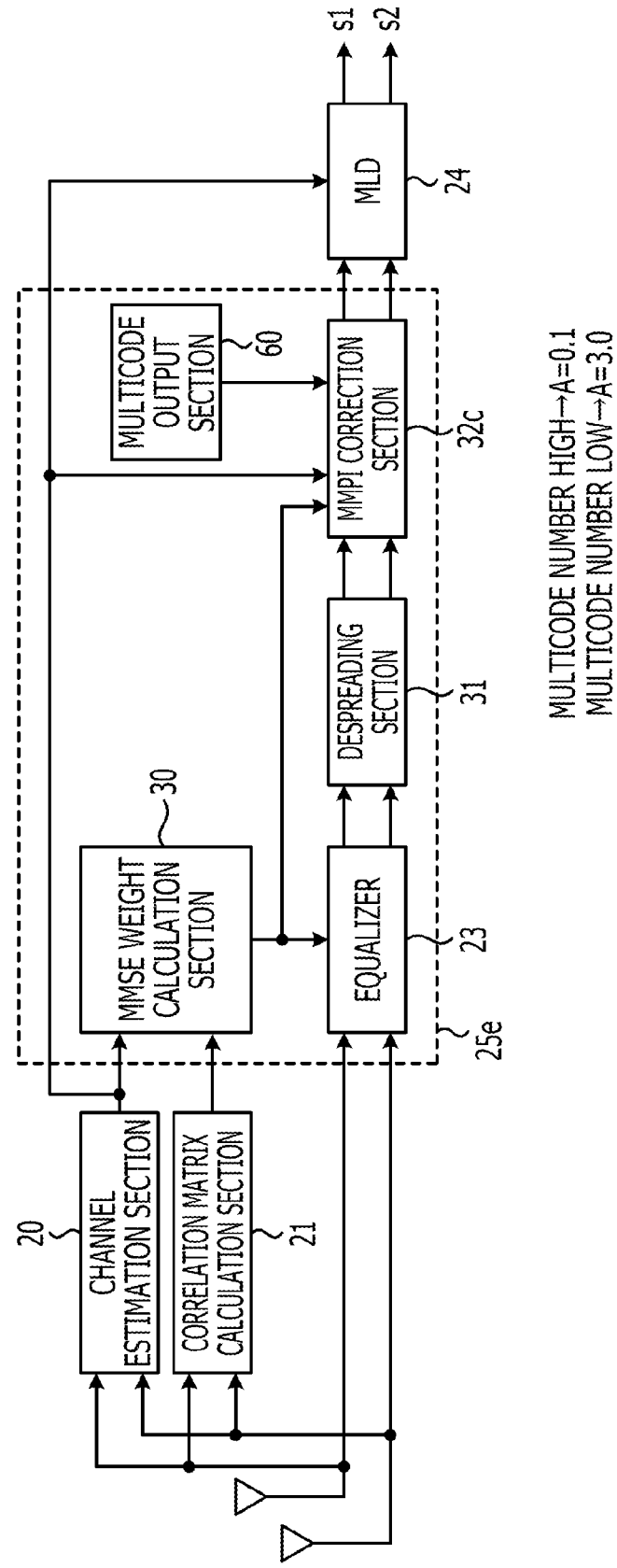
FIG. 8 is a detailed block diagram of another demodulator.

FIG. 8 is a detailed block diagram of a demodulator 12f corresponding to an embodiment of the demodulator 12. The demodulator 12f has the channel estimation section 20, the correlation matrix calculation section 21, an interference processing section 25e, and the MLD 24. The interference processing section 25e executes the MMPI processing. The interference processing section 25e has the MMSE weight calculation section 30, the equalizer 23, the despreading section 31, an MMPI correction section 32c, and a multicode output section 60. In the demodulator 12f of FIG. 8, the demodulator 12d of the same component as FIG. 5 is assigned with the same reference sign, and a description thereof will be omitted.

In contrast to the demodulator 12d, the demodulator 12f has the multicode output section 60 instead of the S/N estimation section 40. The multicode output section 60 outputs the set multicode number to the MMPI correction section 32. The multicode number is a code number set in accordance with a transmission bit rate. For example, in a high speed downlink packet access (HSDPA), a spreading factor is 16, and the code number is selected in a range from 1 to 15.

In a spreading-despreading processing, the influence of the multipath interference is large when the multicode number is high, but the influence of the multipath interference is small when the multicode number is low. Because the MMPI processing is employed for cancelling the influence of the multipath interference, if the MMPI processing is executed when the influence of the multipath interference is small, a characteristic thereof may be rather deteriorated.

In view of the above, when the multicode number is higher than the previously set threshold, by setting A=0.1 in Expression (19) and Expression (20), the MMPI correction section 32c validates the MMPI processing. On the other hand, in a case where the multicode number is lower than or equal to the previously set threshold, by setting A=3.0 in Expression (19) and Expression (20), the MMPI correction section 32c invalidates the MMPI processing in the MMPI correction section 32.

As described above, the demodulator 12f can improve the characteristic of the demodulation processing by validating or invalidating the MMPI processing in accordance with the set multicode number.

It is noted that the MMPI correction section 32c of the demodulator 12f may execute the process of FIG. 6 similarly as in the MMPI correction section 32b of FIG. 5. By executing the process of FIG. 6, the MMPI correction section 32c can avoid the increase in the wasteful computation load.

Figure 9:
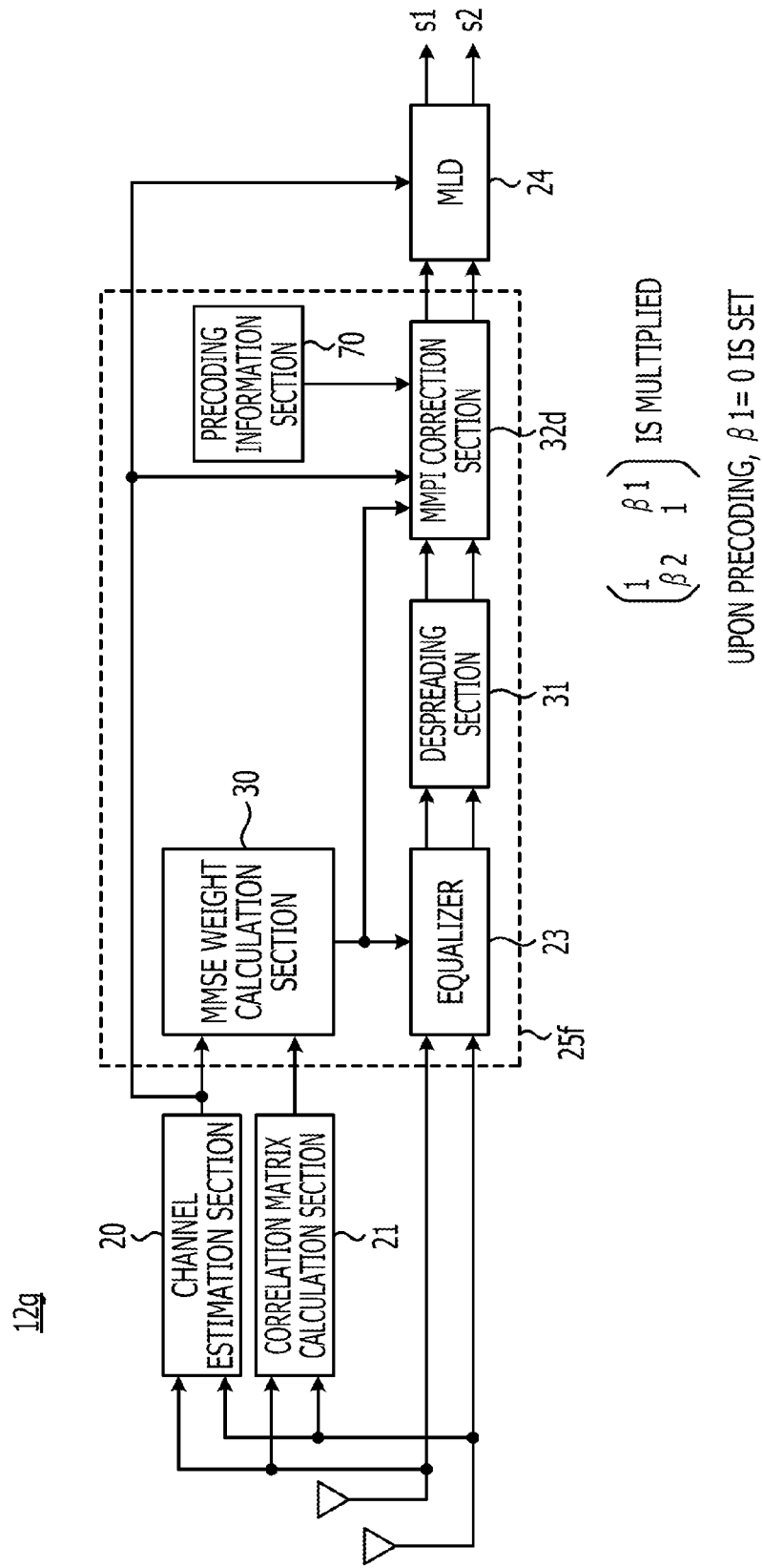
FIG. 9 is a detailed block diagram of another demodulator.

FIG. 9 is a detailed block diagram of a demodulator 12g corresponding to an embodiment of the demodulator 12. The demodulator 12g has the channel estimation section 20, the correlation matrix calculation section 21, an interference processing section 25f, and the MLD 24. The interference processing section 25f executes the MMPI processing. The interference processing section 25f has the MMSE weight calculation section 30, the equalizer 23, the despreading section 31, an MMPI correction section 32d, and a precoding information section 70. In the demodulator 12f of FIG. 8, the demodulator 12d of the same component as FIG. 5 is assigned with the same reference sign, and a description thereof will be omitted.

In contrast to the demodulator 12f, the demodulator 12g is provided with the precoding information section 70 instead of the multicode output section 60. The precoding information section 70 outputs the signal-to-noise ratio to the MMPI correction section 32 in the respective steams where the transmissions are carried out on the basis of the MIMO.

The precoding means that the same signals are transmitted from the respective transmission antennas in the MIMO while being weighted at an appropriate phase so that the power of the signal is maximized on the reception side. Through the precoding, a bias of the signal-to-noise ratios occurs in the respective steams where the transmissions are carried out on the basis of the MIMO. In a case where the bias of the signal-to-noise ratios occurs in the streams, the effect of the MMPI processing with respect to the respective streams is larger as the signal-to-noise ratio is lower. When an error of the correction factor β is also taken into account, preferably, the MMPI processing is not executed on the stream where the effect of the MMPI processing is small.

In view of the above, the MMPI correction section 32d compares the signal-to-noise ratio for each of the streams output from the precoding information section 70 with the previously set threshold to determine whether or not the MMPI equalizing is carried out on each of the streams. In a case where it is determined that the MMPI equalizing is not carried out, the MMPI correction section 32d sets the correction factor β accumulated on the stream of the determination target as 0.

As described above, the demodulator 12g validates or invalidates the correction factor β in accordance with the signal-to-noise ratio for each stream. By invalidating the unused MMPI processing, the demodulator 12g can reduce the computation amount and also improve the characteristic of the demodulation processing.

Figure 10:
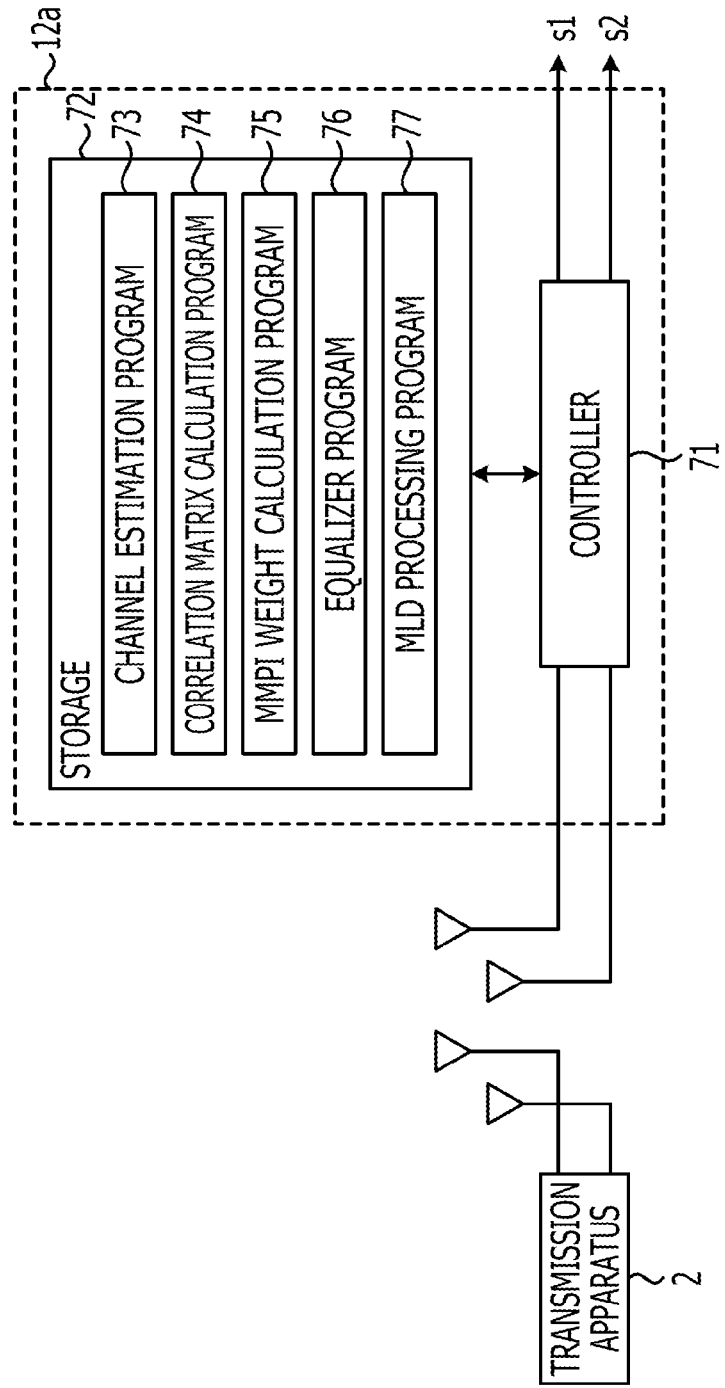
FIG. 10 is a hardware block diagram in a case where the demodulator of FIG. 2 is realized by a software program.

FIG. 10 is a hardware block diagram in a case where the demodulator 12a according to the present embodiment is realized by software programs. The demodulator 12a has the controller 71 and a storage 72.

The controller 71 can realize various functions by reading out programs stored in the storage 72 and executing the programs. The controller 71 is, for example, a central processing unit (CPU). The storage 72 stores a channel estimation program 73, a correlation matrix calculation program 74, an MMPI weight calculation program 75, an equalizer program 76, and a MLD processing program 77. The storage 72 is, for example, a read only memory (ROM) or a random access memory (RAM).

The controller 71 functions as the channel estimation section 20 by executing the channel estimation program 73. The controller 71 functions as the correlation matrix calculation section 21 by executing the correlation matrix calculation program 74. The controller 71 functions as the MMPI weight calculation section 22 by executing the MMPI weight calculation program 75. The controller 71 functions as the equalizer 23 by executing the equalizer program 76. The controller 71 functions as the MLD 24 by executing the MLD processing program 77. The details of the respective functions are as described above.

By causing the controller 71 to execute the programs stored in the storage 72 as described above, the demodulator 12a can be realized by the software programs. It is noted that according to the present embodiment, the demodulator 12a has been described as an example, but another demodulator can similarly be realized by the software programs.

Figure 11:
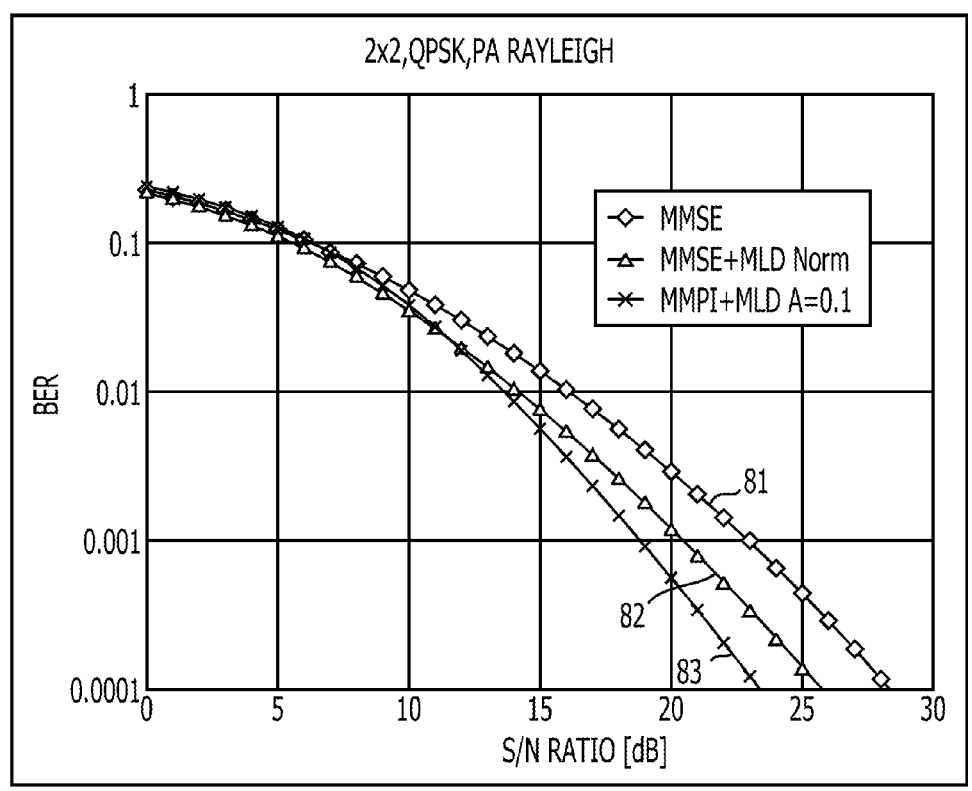
FIG. 11 is a graphic representation of an effect of the demodulator according to an embodiment.

FIG. 11 is a graphic representation of an effect of the demodulator 12 according to the present embodiment. In FIG. 11, the horizontal axis indicates the signal-to-noise ratio of the reception signal (S/N ratio). The vertical axis indicates a bit error rate (BER) after the demodulation processing. The bit error rate refers to a probability that a bit error occurs in the signal after the demodulation processing. The antennas have the configuration of 2×2 MIMO, the modulation system is the QPSK, and the signals are subjected to Rayleigh fading.

In FIG. 11, a graphic representation 81 indicates a relationship between the signal-to-noise ratio of the reception signal in a case where only the MMSE processing is executed and the bit error rate after the demodulation processing. A graphic representation 82 indicates a relationship between the signal-to-noise ratio of the reception signal in a case where the MLD processing is executed after the execution of the MMSE processing and the bit error rate after the demodulation processing. A graphic representation 83 indicates a relationship between the signal-to-noise ratio of the reception signal in a case where the MLD processing is executed after the execution of the MMPI processing in which A=0.1 is set and the bit error rate after the demodulation processing corresponding to the demodulator 12 according to the present embodiment.

For example, when attention is paid to the signal-to-noise ratio for realizing BER=0.01, by executing the MLD processing after the execution of the MMSE processing, as compared with the case in which only the MMSE processing is executed, it is found out from the graphic representation 81 and the graphic representation 82 that an improvement is made by 2.5 dB. Furthermore, by executing the MLD processing after the execution of the MMPI processing in which A=0.1 is set, as compared with the case where the MLD processing is executed after the execution of the MMSE processing, it is found out from the graphic representation 82 and the graphic representation 83 that an improvement is made by 0.5 dB.

Since it suffices even when the signal-to-noise ratio may be low for realizing the same value of BER, the demodulator 12 can correctly receive the signals at an even lower signal quality. In addition, since it suffices when an even lower transmission power may be employed to realize the same value of BER, the transmission apparatus 2 can reduce the transmission power for the signals.

As described above, according to the above-mentioned embodiment, it is possible to execute the efficient equalizing processing in which the inter-antenna interference removal by the MLD processing is taken into account.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reception apparatus comprising:
a plurality of reception antennas configured to receive transmission signals transmitted from a plurality of transmission antennas;
a first interference processing section configured to perform a weighting processing of imparting a weight to reduce a multipath interference component corresponding to an intersymbol interference based on a multipath adjusting an amplitude of an inter-antenna interference component that a transmission signal from one transmission antenna gives to a transmission signal from another transmission antenna; and
a second interference processing section configured to remove the inter-antenna interference component with respect to each of the plurality of reception signals on which the weighting processing is performed,
wherein the first interference processing section includes
a weight calculation section configured to calculate a weight factor at which only the power of the multipath interference minimized on the basis of a propagation channel vector estimated on the basis of the reception signal and a correlation matrix between a plurality of transmission and reception antennas,
an equalizer configured to perform a weighting processing on the reception signal with the calculated weight factor, and
a correction section configured to add the inter-antenna interference component to the reception signal after the weighting processing.

2. The reception apparatus according to claim 1,
wherein the first interference processing section further includes a despreading section configured to perform a despreading processing on the reception signal after the weighting processing which is output from the equalizer and output the signal to the correction section.

3. The reception apparatus according to claim 1,
wherein the correction section invalidates the addition processing on the reception signal in a case where the inter-antenna interference component to be added is lower than a previously set threshold.

4. The reception apparatus according to claim 1,
wherein the correction section adjusts an addition amount of the inter-antenna interference component in accordance with a processing result of the second interference processing section.

5. The reception apparatus according to claim 1, further comprising:
a signal-to-noise ratio estimation section configured to output an estimation result of the signal-to-noise ratio of the reception signal on the basis of the propagation channel vector to the correction section,
wherein the correction section invalidates the addition processing on the reception signal in a case where the estimation result of the signal-to-noise ratio is higher than a previously set threshold.

6. The reception apparatus according to claim 1,
wherein the second interference processing section removes the inter-antenna interference component with respect to each of the plurality of reception signals through a maximum likelihood detection processing.

7. A radio communication method comprising:
receiving transmission signals transmitted from a plurality of transmission antennas by a plurality of reception antennas;
performing a first interference processing of imparting a weight to reduce a multipath interference component corresponding to an intersymbol interference based on a multipath adjusting an amplitude of an inter-antenna interference component that a transmission signal from one transmission antenna gives to a transmission signal from another transmission antenna; and
performing a second interference processing of removing the inter-antenna interference component with respect to each of the plurality of reception signals on which the processing of reducing the multipath interference component is performed,
wherein the first interference processing includes
calculating a weight factor at which only the power of the multipath interference is minimized on the basis of a propagation channel vector estimated on the basis of the reception signal and a correlation matrix between a plurality of transmission and reception antennas,
performing a weighting processing on the reception signal with the calculated weight factor, and
a correction processing of adding the inter-antenna interference component to the reception signal after the weighting processing.

8. The radio communication method according to claim 7,
wherein the first interference processing further includes performing a despreading processing on the reception signal after the weighting processing to be output to the correction processing.

9. The radio communication method according to claim 7,
wherein the correction processing includes invalidating the addition processing on the reception signal in a case where the inter-antenna interference component to be added is lower than a previously set threshold.

10. The radio communication method according to claim 7,
wherein the correction processing includes adjusting an addition amount of the inter-antenna interference component in accordance with a result of the second interference processing.

11. The radio communication method according to claim 7, further comprising:
outputting an estimation result of the signal-to-noise ratio of the reception signal on the basis of the propagation channel vector to the correction processing, wherein the correction processing includes invalidating the addition processing on the reception signal in a case where the estimation result of the signal-to-noise ratio is higher than a previously set threshold.

12. The radio communication method according to claim 7, wherein the second interference processing includes removing the inter-antenna interference component with respect to each of the plurality of reception signals through a maximum likelihood detection processing.

13. A radio communication system comprising:
a transmission apparatus including a plurality of transmission antennas; and
a reception apparatus including
a plurality of reception antennas configured to receive transmission signals transmitted from the plurality of transmission antennas,
a first interference processing section configured to perform a weighting processing of imparting a weight to reduce a multipath interference component corresponding to an intersymbol interference based on a multipath adjusting an amplitude of an inter-antenna interference component that a transmission signal from one transmission antenna gives to a transmission signal from another transmission antenna, and
a second interference processing section configured to remove the inter-antenna interference component with respect to each of the plurality of reception signals on which the weighting processing is performed,
wherein the first interference processing section includes
a weight calculation section configured to calculate a weight factor at which only the power of the multipath interference is minimized on the basis of a propagation channel vector estimated on the basis of the reception signal and a correlation matrix between a plurality of transmission and reception antennas,
an equalizer configured to perform a weighting processing on the reception signal with the calculated weight factor, and
a correction section configured to add the inter-antenna interference component to the reception signal after the weighting processing.

* * * * *